United States Patent [19]

McClaughry et al.

[11] Patent Number: 5,933,825
[45] Date of Patent: Aug. 3, 1999

[54] ARBITRATING CONCURRENT ACCESS TO FILE SYSTEM OBJECTS

[75] Inventors: Patrick McClaughry, Sunnyvale; Max McFarland, Santa Clara; Peter McInerney, Cupertino; Wayne Loofburrow, Sunnyvale; Daniel Walkowski, Cupertino, all of Calif.

[73] Assignee: Apple Computer, Inc., Cupertino, Calif.

[21] Appl. No.: 08/897,696

[22] Filed: Jul. 21, 1997

[51] Int. Cl.[6] .................................................. G06F 17/30
[52] U.S. Cl. .............................. 707/8; 707/103; 707/200; 707/205; 395/726
[58] Field of Search .............................. 707/8, 200, 205, 707/103; 395/726

[56] References Cited

U.S. PATENT DOCUMENTS

| 5,129,083 | 7/1992 | Cutler et al. | 707/103 |
|---|---|---|---|
| 5,371,885 | 12/1994 | Letwin | 707/205 |
| 5,414,839 | 5/1995 | Joshi | 707/8 |
| 5,493,728 | 2/1996 | Solton et al. | 711/113 |
| 5,568,639 | 10/1996 | Wilcox et al. | 707/200 |
| 5,590,326 | 12/1996 | Manabe | 711/150 |
| 5,664,189 | 9/1997 | Wilcox et al. | 707/205 |
| 5,692,178 | 11/1997 | Shaughnessy | 707/8 |
| 5,692,180 | 11/1997 | Lee | 707/10 |
| 5,737,536 | 4/1998 | Herrmann et al. | 395/200.59 |
| 5,787,439 | 7/1998 | Taysom | 707/103 |

*Primary Examiner*—Paul R. Lintz
*Attorney, Agent, or Firm*—Burns, Doane, Swecker & Mathis, L.L.P.

[57] ABSTRACT

A locking scheme is provided to arbitrate thread access to file system objects. This locking scheme allows multiple threads simultaneous access to file system objects for certain concurrently compatible operations, while forbidding concurrently incompatible operations. Separate types of locks are provided for hierarchical relationships between objects and the contents (e.g., data) of the objects themselves.

35 Claims, 4 Drawing Sheets

| RC COUNTER | WC FLAG | HRC COUNTER | HWC COUNTER | RK COUNTER | WK FLAG | WK OWNER ID |

| Current Lock | Desired Lock | | | | | |
|---|---|---|---|---|---|---|
| | RC | WC | HRC | HWC | RK | WK |
| RC | Y | N | Y | N | Y | N |
| WC | N | N | N | N | Y | Y |
| HRC | Y | N | Y | Y | Y | Y |
| HWC | N | N | Y | Y | Y | Y |
| RK | Y | Y | Y | Y | Y | Y |
| WK | N | Y | Y | Y | Y | N |

*FIG. 8*

ARBITRATING CONCURRENT ACCESS TO FILE SYSTEM OBJECTS

BACKGROUND

This invention generally relates to techniques and systems for accessing objects in computers and, more particularly, to techniques and systems which efficiently arbitrate concurrent access to objects in multithreaded or multitasking computer systems.

The evolution of the computer industry is unparalleled in its rate of growth and complexity. Personal computers, for example, which began as little more than feeble calculators with limited memory, tape-driven input and monochrome displays, are now able to tackle almost any data processing task. While this meteoric increase in power was sufficient to satisfy the demands of most application programmers and end users, the corresponding increase in complexity associated with computers created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's, many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employs these concepts was, and continues to be, the interface which allows the user to input commands and data and receive results, which is commonly referred to as a graphical user interface (GUI).

One type of GUI is based on a visual metaphor which uses a monitor screen as a work surface called a "desktop" where documents are presented in relocatable regions termed "windows". The user interacts with the computer by, for example, moving objects on the desktop, choosing commands from menus and manipulating window controls, such as checkboxes and scrollbars. These objects may include, for example, files and folders which are iconically represented on the desktop and whose contents are stored by a file management system. An exemplary desktop screen is reproduced as FIG. 1.

The success of this type of interface is evident from the number of companies which have emulated the desktop environment. Even successful concepts, however, must continually be improved upon to keep pace with the rapid growth in this industry. For example, the advent of multimedia, especially CD-ROM devices, has provided vast quantities of secondary storage which have been used to provide video capabilities, e.g., live animation and video clips, as regular components of application displays. As these new capabilities are developed, the GUIs and underlying operating system software are modified or rewritten to take advantage thereof.

In the last few years, personal computers have been evolving towards multitasking, i.e., the capability to run several applications concurrently. Initial steps toward true multitasking included the capability to display several applications at once, i.e., in different windows, albeit only one application was active at a time, and to allow the user to easily switch between the windowed applications. In true multitasking environments, each application is associated with one or more threads which independently coordinate the processing for that application. This leads to the possibility that two or more threads may attempt to operate on a file system object, e.g., a file or a folder, at the same time. In certain situations, e.g. when one thread is altering data while another is reading the same data, concurrent access to file system objects is problematic.

Figure 2:
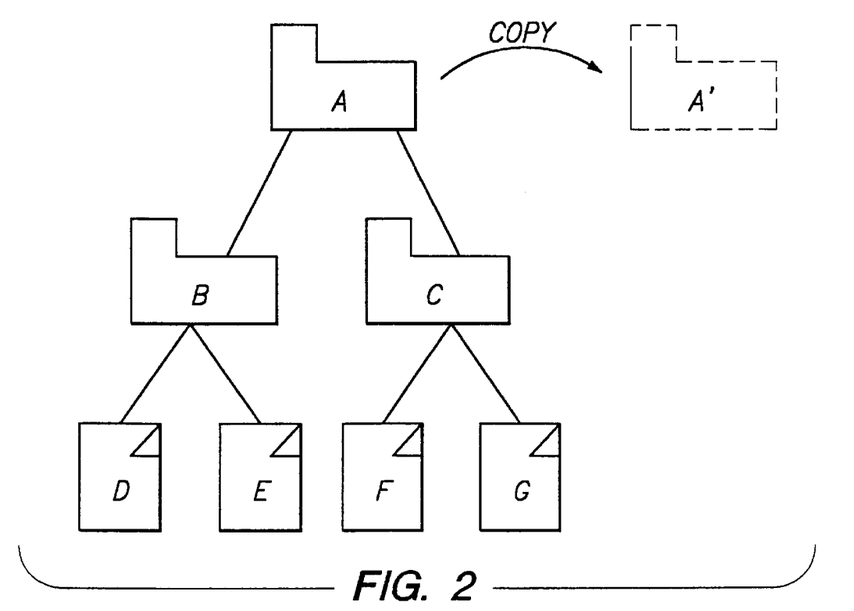
FIG. 2 illustrates a hierarchical file system object structure used to describe the operation of conventional file system access techniques as well as file system access techniques according to the present invention.

For example, consider the hierarchical arrangement of file system objects illustrated in FIG. 2. Therein, a tree is illustrated with a root folder A having two child folders B and C, each containing a pair of files D and E and F and G, respectively. Suppose that a user wants to copy folder A to a new folder A' as illustrated and, while the copying process is ongoing, attempts to modify the contents of file E. The question then arises as to whether this latter operation should be permitted and, if so, will the contents of the copy A' include the original file E or the modified version of file E.

These types of concurrent access problems for file systems have been addressed in conventional multitasking systems. According to one solution, which has implemented as part of the WINDOWS 95 operating system, access to an object and its children is completely restricted while an operation involving the object is in progress. Thus, in the context of the example of FIG. 2, the user would not be permitted to modify (or even view) any of the objects A–G while folder A was being copied to create folder A'. However, this solution has the drawback that it may severely limit a user's access to many objects (for example if a very large copy operation is being performed), which frustrates the objectives behind multitasking. Moreover, such a complete access restriction is unwarranted for certain combinations of activities, e.g., viewing an object while copying that object or moving an object while copying that object, which can be performed in parallel.

Another solution to concurrent access of file system objects is to simply provide no access restrictions. This solution is found, for example, in the NeXT operating system and provides the user with the freedom to perform plural operations on the same object at the same time. However, completely unrestricted access to the same objects also creates certain problems. Consider again the example of FIG. 2 with unrestricted access. If the user modifies file E before that file has been copied to folder A', then folder A and folder A' will be identical at the end of the copy operation. If, however, the user modifies file E after file E has been copied then the contents of folder A and folder A' will be different. This is just one example of the uncertainty of results which manifests itself as a result of completely unrestricted multithreaded access to file system objects.

Accordingly, it would be desirable to provide techniques and systems for managing file system objects in a multithreaded enviromnent in which multiple threads can simultaneously operate on the same object whenever possible to maximize throughput and availability of objects to a user, but without causing object incoherency and inconsistent file operation results.

SUMMARY

These and other problems of previous computer systems and methods are solved by Applicants' invention, wherein a locking scheme is provided to arbitrate threaded access to file system objects. This locking scheme has been developed to allow multiple threads simultaneous access to file system objects for certain concurrently compatible operations, while forbidding concurrently incompatible operations. According to exemplary embodiments of the present invention, separate locks are provided for hierarchical relationships between objects and the contents (e.g., data) of the objects themselves.

According to exemplary embodiments of the present invention, three read locks and three write locks are provided. A read contents lock indicates that an object is currently being read by a thread. A hierarchical read contents lock indicates that a descendant of an object is currently being read. A read children lock indicates that all of the children of a particular object are being read. A write contents lock indicates that an object is being written. A hierarchical write contents lock indicates that a descendant of a particular object is being written. A write children lock indicates that the children of an object are being written. These locks can be used in combination to determine when to allow a second thread access to an object which is currently being manipulated by a first thread. When access is denied, the user can be so notified.

BRIEF DESCRIPTION OF THE DRAWINGS

The features and objects of Applicants' invention will be understood by reading this description in conjunction with the drawings, in which.

DETAILED DESCRIPTION

The following description includes exemplary embodiments wherein locks are maintained (e.g., granted, denied, released, etc.) by an application, e.g., the Finder application in the MACINTOSH computer system, which provides an interface between the user and the file system. However, those skilled in the art will appreciate that the present invention is equally applicable in other contexts, e.g., wherein the file management system itself maintains locks and arbitrates object access. Moreover, although those skilled in the art will be familiar with the hardware components of such computer systems, exemplary components are briefly described herein to provide a thorough understanding of the manner in which the features of the invention cooperate with the components of a computer system to produce the desired results.

Figure 3:
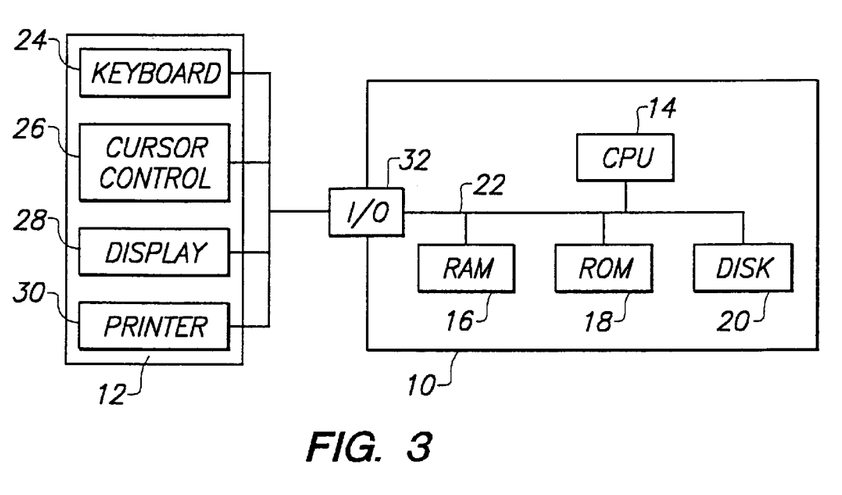
FIG. 3 is an exemplary computer system in which the present invention can be implemented.

Referring to FIG. 3, the computer system includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or an LCD screen, provides a visual display of the information that is being processed within the computer, for example the contents of a document or a computer-generated image. A hard copy of this information can be provided through a printer 30, or similar such device. Each of these external peripheral devices communicates with the CPU 14 by means of one or more input/output ports 32 on the computer. According to exemplary embodiments of the present invention, the computer system of FIG. 3 is adapted to handle multitasking or multithreaded operation using a combination of hardware and software which is well known to those skilled in the art.

As mentioned above, a GUI such as that illustrated in FIG. 1 may be used to allow a user to interact with the computer system of FIG. 3. For each icon viewable on the GUI, a file system object is stored in memory, e.g., one or more of devices, 16, 18 and 20. Since the computer 10 is capable of performing multiple tasks simultaneously, requests may be made to operate on one file system object at the same time. For example, suppose that a user "drags and drops" the System folder depicted in FIG. 1 onto the desktop to initiate a copy operation on that file system object and, while the copying operation is ongoing, attempts to manipulate one of the objects within the System folder.

Additionally, handling these concurrent file system object accesses is complicated by certain idiosyncracies of file system operation. For example, file system operations occur individually rather than as a transaction involving a unified set of operations as, e.g., many databases operate. Moreover, file systems typically provide no recovery from partially executed operations and are subject to periodic failures associated with, for example, contaminated memory media. Exemplary embodiments of the present invention, described below, provide techniques for arbitrating this type of concurrent file system object request in a robust manner designed to accommodate file system operations.

In order to provide a more complete understanding of the present invention, but without limiting the scope thereof, certain terminology is used throughout this specification and is defined as follows.

The term "ancestor" refers to an object that is on the path between another object and the root in a hierarchy of objects. For example, returning to FIG. 2, the ancestors of object E include folders A and B, while the ancestors of object G include folders A and C.

The term "descendant" or "child" refers to an object that is on the path from an object away from the root in a hierarchy of objects. For example, again in FIG. 2, objects D and E are descendants (children) of folders A and B, while objects F and G are descendants (children) of folders A and C.

In order to distinguish between permissible (compatible) concurrent object operations and impermissible (incompatible) concurrent object operations, the present invention uses a plurality of locks and access rules involving these locks. According to exemplary embodiments of the present invention, six different kinds of read and write locks are provided, however those skilled in the art will appreciate that the number of different kinds of locks used can be reduced or increased depending upon, for example, the number of combinations of operations to be arbitrated. From an implementation perspective these locks can, for example, be manipulated using a lock record associated with each file system object.

Figure 4:
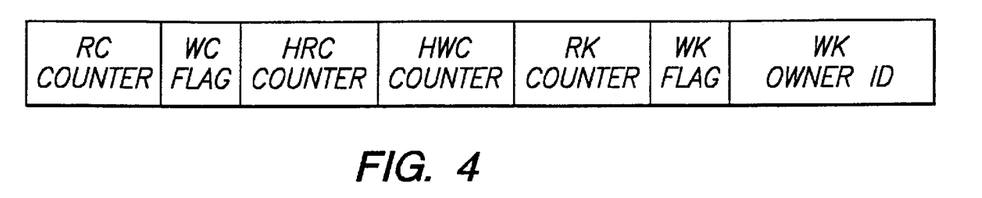
FIG. 4 is a lock record format according to an exemplary embodiment of the present invention.

Lock records are maintained by the interface application (or file system), an exemplary format of which is illustrated as FIG. 4. As can be seen in FIG. 4, a lock record contains a plurality of fields associated with the various locks used in systems and techniques according to the present invention. Note that the order of the fields illustrated in FIG. 4 is merely exemplary and that these fields can be stored in any desired order within the locked record. Each of the six locks described herein has a corresponding counter or flag depending upon whether an object can acquire plural locks of the same type as will be described below. The write children (WK) lock also has associated therewith an owner ID field. This field can be used by program code to determine ownership of a particular WK lock which will enable that code to determine whether it has access to a particular object. For example, consider a command which operates as a sequence of subcommands. If the command acquires a WK lock with respect to a certain object and one of its subcommands subsequently needs a WK lock with respect to the same object, then this identifier provides a mechanism whereby the arbiter can permit the subcommand to perform its intended write operation despite the existing WK lock. These lock records can be stored in memory using any conventional data storage techniques. Typically, lock records are created when a first lock is acquired for an object and erased when a last lock record is released for that object, so as to reduce the storage associated with maintaining these records for each object.

There are three types of read locks. A Read Contents (RC) lock is required to read an object's data. For example, in order to read a file system object (e.g., copy a file within a folder to some other location), an application or thread must first acquire an RC lock for that object. This is accomplished by checking the lock record associated with that particular object to determine if an RC lock is available. If no lock record exists at all for a particular object, then the application would create a lock record for that object having an RC field value set equal to one. As seen in FIG. 4, the RC field can be formatted as a reference count field which is incremented as RC locks are acquired and decremented as RC locks are released, since there may be multiple simultaneous readers of any given object.

If a lock record does exist for this particular object, then that record is evaluated by the application to determine if the existing locks permit an RC lock to be acquired. This procedure will be described below with respect to FIG. 5. Failure to obtain an RC lock implies that the object is currently involved in an operation during which reading is undesirable, e.g., its data is being rewritten or erased, and a message to that effect can be generated on the GUI to notify the user that the desired operation is currently impermissible.

When an RC lock is acquired by the application for a particular object, a second type of read lock, referred to herein as a Hierarchy Read Contents (HRC) lock, is propagated up the hierarchy of objects from the object which has been RC locked, to the root. That is, in addition to incrementing an RC lock field in that object's lock record, the application also increments an HRC field associated with each ancestor of that object. This allows the application to quickly determine, for other access requests, whether a descendant of any particular object has an RC lock. For example, referring again to FIG. 2, if the application acquires an RC lock on file E, then both folders A and B would acquire an HRC lock. Those skilled in the art will appreciate that this feature of the present invention provides a mechanism to more quickly determine whether locks exist in the file system object hierarchy, as compared with searching down through the hierarchy to actually locate any existing RC locks. Like the RC field in the lock record, the HRC field is reference counted since multiple threads may read an object's contents simultaneously. Thus, if one thread obtains an RC lock for file D and another thread obtains an RC lock for file E, both folders A and B will have two HRC locks.

The third type of read lock is used to arbitrate concurrent access to the immediate descendants of a particular object and is referred to herein as a Read Children lock (and which is abbreviated "RK" so as to distinguish this type of lock from a Read Contents lock). Like content locking, RK locks are used by arbitration schemes according to the present invention to allow multiple threads to read an object's children simultaneously, but only allow one thread to write (e.g., add or remove) children at any one time. Unlike content locking, however, RK locks permit a thread to read an object's children while another thread is reading or writing the contents of that object. This capability allows certain system functionality, e.g., window redrawing, to be performed without delay. To accommodate simultaneous reading and writing of children, a copy of the initial state of the children can be created so that one or more threads can read the backup collection while another thread is writing to the original set of children. Like the other two types of read locks, the RK lock can be implemented as a reference count in the lock record since multiple RK locks can be associated with an object at any given time.

There are also three types of write locks according to exemplary embodiments of the present invention. For example, in order to make changes to a file system object (e.g., update contents of a file), the application must acquire a Write Contents (WC) lock for that object. This can be accomplished by evaluating the lock record (if any exists) associated with the object that is to be changed as will be described below with respect to FIG. 5. If a lock record exists for this object with a WC flag set to indicate an existing WC lock (i.e., another thread is currently writing this object), then this lock request is denied and the user can be notified. Otherwise, if no lock record currently exists for that object, or if one exists without a WC lock indication, then the WC field is set equal to a value indicating that a WC lock has been acquired, e.g., one. Unlike the RC lock, however, the WC field in the lock record may be a boolean field since only one write operation is permitted on an object at a time.

When a WC lock is acquired each of the ancestors of that object acquires a Hierarchical Write Contents (HWC) lock which indicates that a write operation is taking place on an object lower in the hierarchy. The field associated with HWC locks in a lock record is also formatted for counting since it is permissible for a write operation in one sub-branch to co-exist with a write operation in another sub-branch of the hierarchy. For example, if a WC lock is acquired for both files F and G in FIG. 2, folder C would have two HWC locks indicated in its lock record.

Analogously to read locks, the third type of write lock is the Write Children (WK) lock. In conjunction with the RK lock, the WK lock permits simultaneous writing of an object's contents and reading or writing of that object's children as will be described below with respect to FIG. 5.

Figure 5:
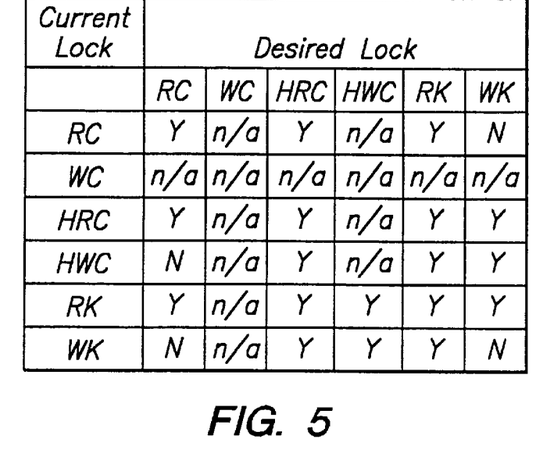
FIG. 5 is a table depicting permissible and impermissible concurrent accesses according to an exemplary embodiment of the present invention.

Having briefly described the various types of locks used to arbitrate concurrent access to file system objects by multiple threads according to the present invention, the ways in which these locks are used by the application to permit or deny concurrent access will now be described with respect to FIG. 5. As mentioned above, for the general case where an object has no current locks, a request for any one of the six locks would be granted. Thus, the lock table in FIG. 5 depicts all of the various permutations where a lock exists for an object and another thread requests another lock for the same object. The results of the second lock request are given by the cells in FIG. 5, wherein Y=lock granted, N=lock denied and n/a=request not logically possible. Each cell in the table will now be described to provide an understanding as to how arbitration schemes delineate which concurrent activities are permissible and which are not.

Starting with the upper leftmost corner of the table, if an RC lock exists for a particular object and another thread also requests an RC lock on that object, then the application would grant the second RC lock. This allows multiple threads to, for example, copy the contents of the same file or folder to two different places at the same time.

As mentioned above, an HRC lock is requested for an object when a descendant of that object has acquired an RC lock. Thus, referring again to FIG. 2, if an RC lock is acquired for file E, an HRC lock will be requested for folder B. If another thread is currently reading folder B, i.e., folder B has an RC lock indicated in its lock record, the HRC lock will nonetheless be granted as indicated in FIG. 5. This permits operations such as the concurrent copying of a file or folder contained within a folder that is itself being copied.

An RK lock may be granted for an object having an RC lock, since it is permissible, for example, to read the children of a folder that is being copied. However, it is not permissible to change the children of a folder that is being copied, since doing so would result in a corrupt copy which might contain more or fewer children than the original object. As mentioned earlier, this is one of the drawbacks of conventional schemes which permit all concurrent accesses to file system objects. Thus, a WK lock will not be granted if an RC lock already exists.

Moving now to the third row of the table in FIG. 5, wherein an HRC lock exists for the object, an RC lock may be granted for that object since it is permissible to copy a folder while one (or more) of its descendants are being copied. Similarly, it is permissible for more than one of a folder's descendants to be copied at the same time, including the same descendant more than once. This is why the HRC field in each object's lock record is formatted as a variable count field.

An RK lock can be acquired for an object having an HRC lock. This permits iterations over a folder's children while the contents of a descendant of the folder are being copied. Likewise, a WK lock can be acquired for an object having an HRC lock, which permits the children of a folder to be changed while one or more of those children are being copied. Of course the same child cannot be changed and copied at the same time since that would require concurrent granting of an RC lock and a WC lock for the same child, which is not permitted as illustrated in FIG. 5.

If one thread seeks to read the contents of an object (e.g., folder B) while another thread is changing the contents of a descendant of that object (e.g., file D), such a request will be denied since corrupt copying may ensue. Thus, as seen in the leftmost cell of the fourth row of FIG. 5, an RC lock will not be granted for an object having an HWC lock. An HRC lock can be granted for an object having an HWC lock, since the contents of a descendant of an object can be copied while the contents of a different descendant are being written. Either an RK or a WC lock may be granted for an object having an HWC lock, since it is permissible to read or change the children of an object, respectively, while the contents of a descendant of that object are being written.

An RK lock indicates that the children of a particular object are being read. All other locks are permissible (except WC) for objects having an RK lock as seen in FIG. 5. It is even permissible to add children to, and remove children from, a folder while another operation is reading the children, i.e., to acquire a WK lock on an object having an RK lock. As mentioned above in the initial discussion of RK locks, when a WK lock is requested, a backup copy of the children list is kept before any changes are made to permit concurrent reading and writing.

Moving now to the last row in FIG. 5, an RC lock cannot be obtained for an object already having a WK lock, because it is not permissible for an object to be copied while the children of the object are changing. Similarly, another WK lock cannot be obtained for the same object, since it is impermissible to allow more than one operation (thread) to change the children of an object at one time. Other locks can be acquired, however, for an object having a Write Children lock.

Having provided a more detailed explanation of the various types of locks used to arbitrate concurrent file system object access according to the present invention, several examples will now be provided to illustrate the way in which these locks operate to allow permissible concurrent accesses and prevent impermissible concurrent accesses.

EXAMPLE 1

To provide a contrast to the conventional techniques for handling concurrent file system accesses described above, this example describes how the situation illustrated in FIG. 2 would be handled according to the present invention. The steps involved in this copy operation according to the present invention are illustrated in the flow chart of FIG. 6.

Figure 6:
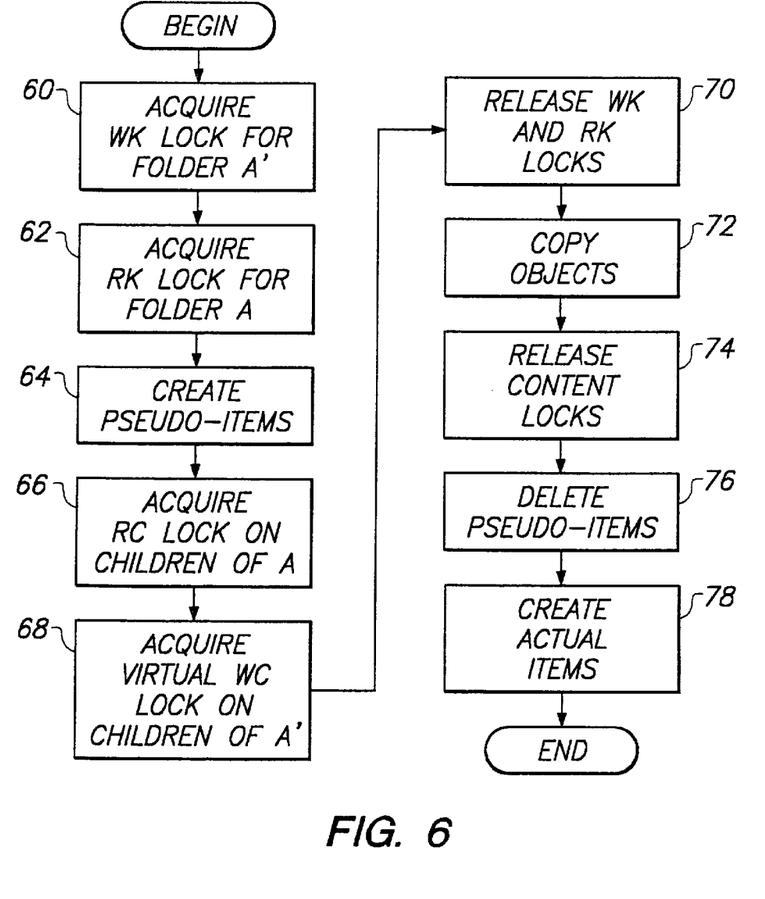
FIG. 6 is a flowchart illustrating an exemplary copy operation according to the present invention.

When the copy operation is initiated from folder A to a new file system object, a WK lock is acquired for the new folder A' at step 60. Then, at step 62, an RK lock is acquired for the original folder A. Next, at step 64, the objects associated with the new folder A', i.e., those objects which correspond to folders B and C and files D, E, F and G, are created as pseudo-items.

Pseudo-items are not true file system objects in the sense that there currently exists no standard file system representation for these pseudo-items. Instead, the pseudo-items exist for the purpose of name conflict detection and for locking but are not visible to the user on the GUI until the copying operation has been completed. This prevent the user from having the option of manipulating objects that have not yet been copied. Moreover, the system can use the pseudo-items to avoid duplicating object names and to avoid impermissible concurrent file system object accesses.

Next, at step 66, an RC lock is acquired for the children of folder A and, at step 68, a WC lock is acquired for the children of A', i.e., the pseudo-items. Once the content locks have been acquired, then the WK and RK locks can be released at step 70 since their purpose was to freeze this portion of the object hierarchy until the pseudo-items could be created and context locks acquired. Next, at step 72, the objects themselves can now be copied. Then, the contents locks can be released at step 74, the pseudo-items deleted at step 76 and actual items created at step 78, whereupon the user can then see the visual representations of these objects on the GUI and manipulate same.

EXAMPLE 2

In this example, the contemplated concurrent accesses involve duplicating an item C in folder A and then moving five files (1–5) into folder A while the duplication takes place. The Duplicate operation will acquire a Write Children lock (WK) lock on folder A. Once it has the WK lock, it will obtain a Read Contents lock (RC) on item C, create a pseudo-item "C copy" and acquire a Write Contents lock (WC) on the pseudo-item. Once the pseudo-item is created, the WK lock is released and the duplication proceeds.

The move operation will acquire a Write Children lock (WK) on the source of the move and a Write Children Lock (WK) on folder A. The move operation will be able to obtain the WK lock on folder A because the duplicate operation no longer has a WK lock. At this point, no other thread can change the children of folder A until the WK lock is released. The move operation iterates over the selection (items 1–25) and determines if there are name conflicts to resolve. At this point, a dialog window may appear on the GUI so that the user can resolve any possible name conflicts. Note that the WK lock on folder A remains in place the entire time. Once any name conflicts are resolved, the items are moved to folder A and both WK locks are released.

Consider the scenario where one of the five items being moved had the same name as the item C that was being duplicated. In this example, the duplicate operation would have started normally, and then the move operation would have noticed a name conflict with one of the items it was trying to move. Since the duplicate operation has a Write Content lock on the item, the move operation would know that it cannot resolve the conflict (i.e, that it could not replace the WC locked item), and would tell the user that the move could not be completed because items with the same name in the destination are busy.

EXAMPLE 3

In this example we are trying to copy the same item A to two different locations, e.g., folder B and the Desktop, at the same time. If the name conflicts can be resolved, this combination of concurrent actions should be successful.

The first copy (item A to folder B) acquires a Write Children lock (WK) on folder B and a Read Contents lock (RC) on item A, creates a pseudo-item "A" in folder B, and obtains a Write Contents lock (WC) on pseudo-item A. Once the content locks are in place, the operation releases the WK locks and proceeds with the copy.

The second copy operation acquires an RK lock on the source, and a WK lock on the Desktop. The second copy operation also needs to get an RC lock on item A. Item A already has an RC lock on it associated with the first copy operation, but that is acceptable since multiple readers are permitted at one time. Thus, the second operation obtains an RC lock on item A, creates a pseudo-item "A" on the Desktop, and gets a WC lock on pseudo-item A. Once the content locks are in place, the operation releases the RK and WK locks and proceeds with the copy.

It can be seen that copying the same item to two different locations is relatively straight-forward. A problem might arise, however, if the operation could not create the pseudo-item in the destination because of a name conflict. Name conflicts are not difficult to resolve using locking mechanisms according to the present invention. If an item is not locked, the operation can ask the user if they would like to replace the existing item. If the user responds positively, the new pseudo-item replaces the old item. Since the new pseudo-item is WC locked until it is completely copied, other processes are prevented from deleting or replacing it until the copy operation is finished. On the other hand, if the new pseudo-item already exists and is locked (either a Read or Write Content lock), the operation does not replace the item and will notify the user that item is busy and cannot be replaced.

EXAMPLE 4

Figure 1:
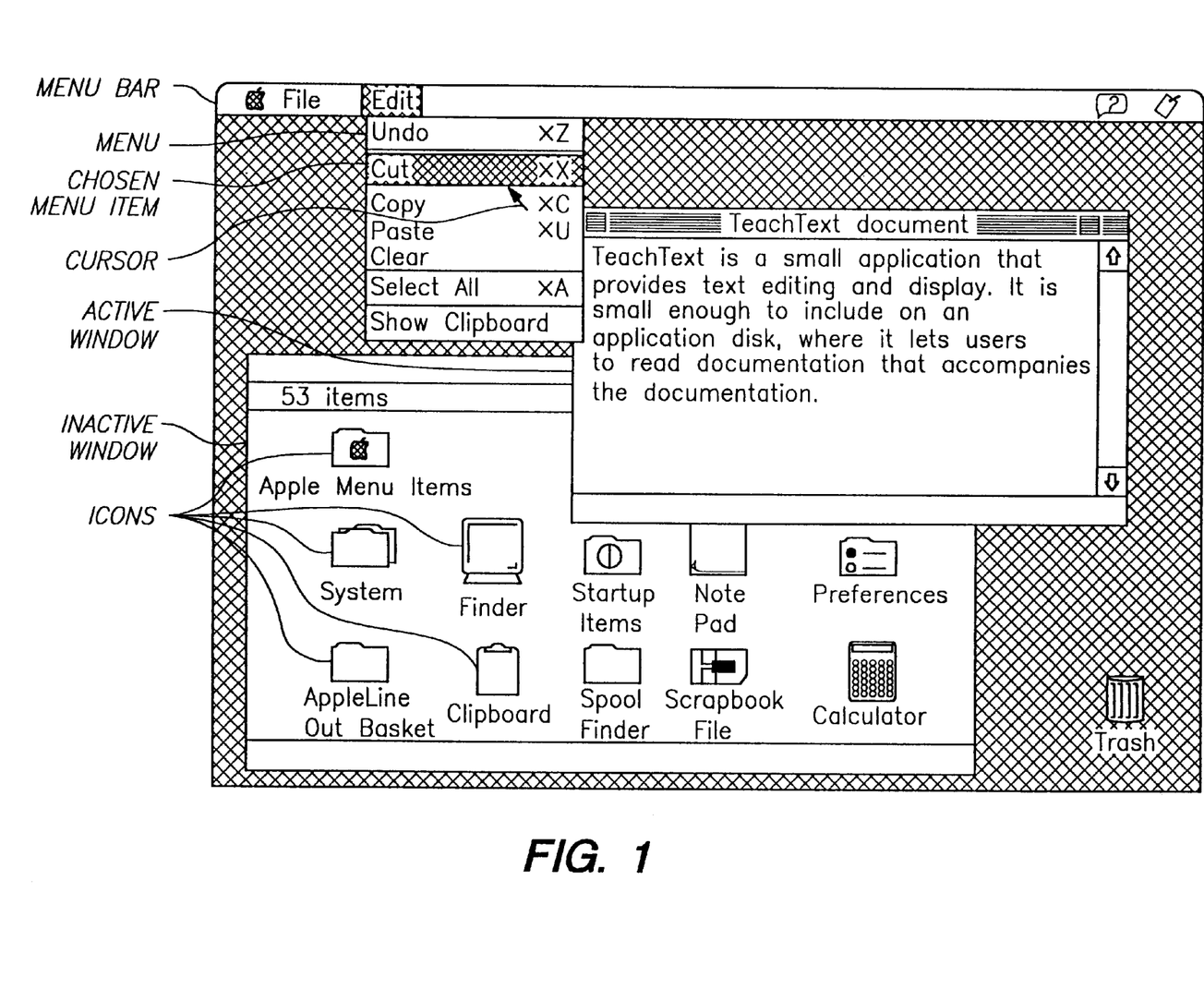
FIG. 1 is an exemplary desktop GUI illustration.

In this example, the concurrent accesses involve duplicating an item (folder A) and moving a child of that item (a subfolder B) into the Trash (seen in FIG. 1). According to the principles described above, this operation should fail, i.e., be identified as impermissible, because it is unknown whether the copy operation will or will not copy the moved item.

The duplicate operation acquires a Write Children lock (WK) lock on the parent of folder A and a Read Contents lock (RC) on folder A. Hierarchy Read Contents locks (HRC) are acquired for all ancestors of folder A. The operation creates a pseudo-item "A copy" and acquires a WC lock on pseudo-item A copy. Once the pseudo-item has been created and locked, the WK lock is released and the duplication proceeds.

The move operation attempts to acquire WK locks on folder B's parent and on the Trash so that it can remove folder B from the children list of B's parent and add it to the children list of the Trash. To acquire a WK lock, the operation will look up the hierarchy for conflicting locks and see that there is an RC lock on one of B's ancestors. This means is that somewhere up the hierarchy, a thread is reading contents and, therefore, nothing in the subtree (e.g., subfolder B) can be moved at this time. The move operation fails to acquire to WK lock and notifies the user that the move could not be completed because folder B was busy.

According to exemplary embodiments of the present invention, the locks described hereinabove are transferrable under certain circumstances. For example, consider the situation depicted in FIG. 7(a). Therein, at a first time T1, folder A has two threads operating on it at the same time. One thread is copying the contents of folder A to some other, unillustrated object. Another thread is moving folder A from its position in the hierarchy under the folder FOO to a position in the hierarchy where it will be a descendant of the folder bar.

Figure 7A:
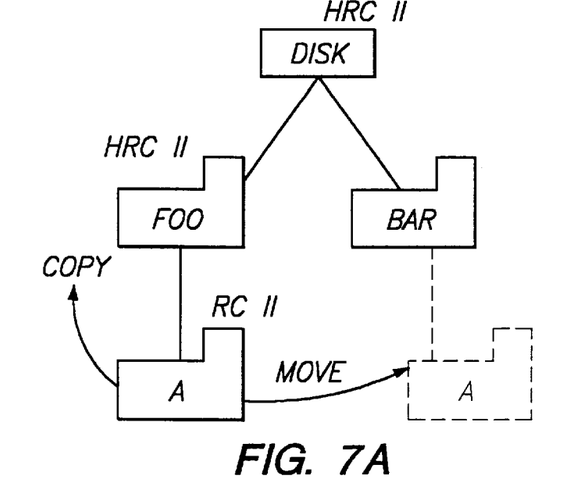
FIGS. 7(a) and 7(b) depict exemplary file system object hierarchies used to explain lock transfer according to the present invention.

At the time T1 illustrated in FIG. 7(a), the lock situation is as follows. The folder A has two RC locks acquired by the two concurrent read operations being performed thereon. Due to those two RC locks associated with folder A, each of its ancestors, i.e., the folder FOO and volume DISK, has two HRC locks.

Figure 7B:
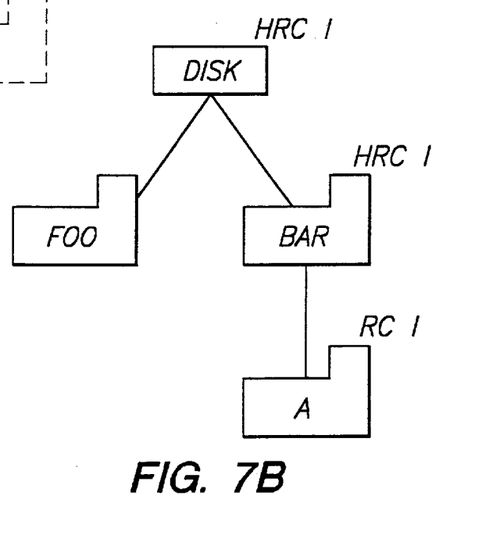

At time T2, the move operation has been completed, but the copy operation is still ongoing. Then the lock situation will be as illustrated in FIG. 7(b). Therein, folder A now has one RC lock associated with its ongoing copy operation and is now a descendant of a folder BAR. Thus, both BAR and DISK have each one HRC lock associated with the current read operation of folder A. This transferring of locks provides consistency in the arbitration access schemes according to the present invention.

It will be understood that Applicants' invention is not limited to the particular embodiments described above and that modifications may be made by persons skilled in the art.

For example, although the foregoing exemplary embodiment describes the copying of children to provide a backup during certain operations, such a backup may be undesirable in exemplary implementations where making the backup copy takes too much time. Accordingly, this feature of the previously described exemplary embodiments can be omitted as long as the access rules illustrated in FIG. 5 are modified to prevent object corruption. For example, the cells wherein the desired lock is RK and the current lock is WK, and the desired lock is WK and the current lock is RK should be changed from 'Y' to 'N' in FIG. 5.

Figure 8:
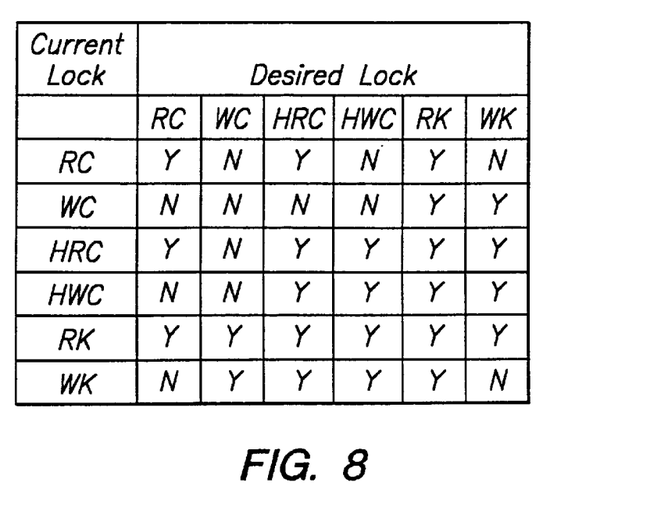
FIG. 8 is a table depicting permissible and impermissible concurrent accesses according to another exemplary embodiment of the present invention.

Moreover, as mentioned earlier, locking techniques according to the present invention may also be implemented at the file system level. In such exemplary embodiments, the access rules illustrated in FIG. 5 could be modified as illustrated in FIG. 8, wherein the "n/a" cell values have been replaced by "Y" or "N" values to reflect the fact that multiple applications may have simultaneous access to file system objects and that pseudo-items need not be used for locking purposes.

As will be appreciated by those skilled in the art, the present invention can be implemented as software written using any appropriate programming language. Thus, the present invention can be embodied on a computer-readable medium, e.g., magnetic or optical, which is read by a computer to perform the above-described functions.

Accordingly, the scope of Applicants' invention is determined by the following claims, and any and all modifications that fall within that scope are intended to be included therein.

We claim:

1. A computer system comprising:
   a memory device for storing file system objects;
   a processor for manipulating said file system objects, said processor adapted to concurrently handle first and second threads; and
   a locking system which arbitrates concurrent access to said file system objects by allowing said first and second threads concurrent access to a same file system object under a first set of conditions and preventing concurrent access to said same file system object under a second set of conditions, wherein said locking system includes locks which indicate that an operation is being performed on a file system object within a hierarchy.

2. The computer system of claim 1, wherein said first set of conditions includes a case wherein said first thread has obtained read access to said same file system object and said second thread seeks read access to said same file system object.

3. The computer system of claim 1, wherein said first set of conditions includes a case wherein said first thread has obtained write access to said same file system object and said second thread seeks write access to said same file system object.

4. The computer system of claim 1, wherein said first set of conditions includes a case wherein said first thread has obtained write access to said same file system object and said second thread seeks read access to said same file system object.

5. The computer system of claim 1, wherein said locking system creates a lock record in said memory system for said same file system object when one of said first and second threads acquires one of a plurality of locks associated therewith.

6. The computer system of claim 5, wherein said locking system deletes said lock record from said memory system after a last lock associated therewith is released.

7. The computer system of claim 5, wherein said one of a plurality of locks is a read contents lock which indicates that a thread is reading an object associated with said lock record.

8. The computer system of claim 1, wherein said first and second threads are associated with one application program.

9. The computer system of claim 8, wherein said one application program permits a user of said computer system to provide commands to said processor to manipulate said file system objects.

10. The computer system of claim 1, wherein said first and second threads are associated with different application programs.

11. The computer system of claim 2, wherein said locking system sets a value in a lock record associated with said same file system object to indicate that a read contents lock has been acquired for said same file system object.

12. The computer system of claim 11, wherein said same file system object is a descendant of at least one other file system object, and wherein said locking system assigns a hierarchical read contents lock to said at least one other file system object as a result of said read contents lock.

13. The computer system of claim 3, wherein said locking system sets a value in a lock record associated with said same file system object to indicate that a write contents lock has been acquired for said same file system object.

14. The computer system of claim 13, wherein said same file system object is a descendant of at least one other file system object, and wherein said locking system assigns a hierarchical write contents lock to said at least one other file system object as a result of said write contents lock.

15. The computer system of claim 1, wherein said locking system can assign at least one of: a read contents lock, a write contents lock, a hierarchical read contents lock, a hierarchical write contents lock, a read children lock and a write children lock to said file system objects based upon a predetermined set of rules.

16. The computer system of claim 1, wherein said locking system further comprises:
   means for transferring locks associated with one of said file system objects when said one of said file system objects is transferred from one branch of file system hierarchy to another branch of said file system hierarchy.

17. The computer system of claim 16, wherein said means for transferring propagates hierarchical read contents locks to new ancestors of said one of said file system objects if said one of said file system objects has a read contents lock associated therewith.

18. The computer system of claim 16, wherein said means for transferring propagates hierarchical write contents locks to new ancestors of said one of said file system objects if said one of said file system objects has a write contents lock associated therewith.

19. The computer system of claim 1, wherein said hierarchy includes at least three levels of file system objects.

20. A method for arbitrating concurrent access to file system objects comprising the steps of:
   receiving a request from a thread to acquire a lock associated with a file system object;
   evaluating a lock record associated with said file system object, wherein said lock record includes information relating to file system objects which have a hierarchical relationship to said file system object; and
   selectively granting said lock to said thread based upon said evaluating step.

21. The method of claim 20, wherein said step of evaluating further comprises the step of determining that said lock record does not currently exist and wherein said step of selectively granting further comprises the step of granting said lock to said thread.

22. The method of claim 20, wherein said step of evaluating further comprises the step of:

identifying at least one lock type currently associated with said file system object based upon fields in said lock record.

23. The method of claim 22, wherein said step of selectively granting further comprises the step of:

determining whether said requested lock and said at least one lock type can co-exist based upon a predetermined set of rules and granting said lock to said thread based upon a result of said determining step.

24. The method of claim 23, wherein said determining and granting step further comprises the step of:

if said requested lock is read contents lock, then granting said lock unless said at least one type of lock is a write lock.

25. The method of claim 24, wherein said write lock includes any one of a write contents lock, a hierarchical write lock and a write children lock.

26. The method of claim 23, wherein said determining and granting step further comprises the step of:

if said requested lock is a write contents lock, then denying said lock unless said at least one type of lock is a read children or write children lock.

27. The method of claim 23, wherein said determining and granting step further comprises the step of:

if said requested lock is a hierarchical read lock, then granting said lock unless said at least one type of lock is a write lock.

28. The method of claim 23, wherein said determining and granting step further comprises the step of:

if said requested lock is a hierarchical write lock, then granting said lock unless said at least one type of lock is a write contents or read contents lock.

29. The method of claim 23, wherein said determining and granting step further comprises the step of:

if said requested lock is a read children lock, then granting said lock.

30. The method of claim 23, wherein said determining and granting step further comprises the step of:

if said requested lock is a write children lock, then granting said lock unless said at least one type of lock is a read contents or write children lock.

31. A method for copying a file system object to a destination object comprising the steps of:

acquiring a write children lock on said destination object;

acquiring a read children lock on said file system object;

creating a plurality of pseudo-items associated with duplicate items to be copied from said file system object;

acquiring a read contents lock on said items;

acquiring a write contents lock on said pseudo-items;

releasing said write children lock and said read children lock;

copying said items;

releasing said read contents and write contents locks;

deleting said pseud-items; and creating file system representations for said copied items.

32. A computer-readable medium having a computer program stored thereon, which program performs the steps of:

creating locks associated with file system object accesses by threads associated with at least one of user manipulation of file system objects and application manipulation of file system objects; and arbitrating concurrent access to said file system objects using said locks, wherein said locks include locks involving a hierarchical relationship between said file system objects.

33. A computer system comprising:

a memory device for storing file system objects;

a processor for manipulating said file system objects, said processor adapted to concurrently handle first and second threads;

a locking system which arbitrates concurrent access to said file system objects by allowing said first and second threads concurrent access to a same file system object under a first set of conditions and preventing concurrent access to said same file system object under a second set of conditions; and means for transferring locks associated with one of said file system objects when said one of said file system objects is transferred from one branch of file system hierarchy to another branch of said file system hierarchy.

34. A computer system comprising:

a memory device for storing file system objects;

a processor for manipulating said file system objects, said processor adapted to concurrently handle first and second threads; and a locking system which arbitrates concurrent access to said file system objects by allowing said first and second threads concurrent access to a same file system object under a first set of conditions and preventing concurrent access to said same file system object under a second set of conditions;

wherein said first set of conditions includes a case wherein said first thread has obtained write access to said same file system object and said second thread seeks write access to said same file system object;

wherein said locking system sets a value in a lock record associated with said same file system object to indicate that a write contents lock has been acquired for said same file system object; and wherein said same file system object is a descendant of at least one other file system object, and wherein said locking system assigns a hierarchical write contents lock to said at least one other file system object as a result of said write contents lock.

35. The computer-readable medium of claim 32, wherein said hierarchical relationship between said file system objects includes at least three levels of file system objects.

* * * * *

UNITED STATES PATENT AND TRADEMARK OFFICE

CERTIFICATE OF CORRECTION

PATENT NO. : 5,933,825

DATED : August 3, 1999

INVENTOR(S) : Patrick McCAUGHRY, et al.

It is certified that an error appears in the above-identified patent and that said Letters Patent is hereby corrected as shown below:

On the title page

Under Inventors: Inventor Wayne Loofbourrow is misspelled, there should be an "o" before the "u" in his last name, i.e. Loofbourrow.

Signed and Sealed this

Seventeenth Day of April, 2001

*Attest:*

NICHOLAS P. GODICI

*Attesting Officer*     *Acting Director of the United States Patent and Trademark Office*